United States Patent [19]

Zieg

[11] 4,338,689

[45] Jul. 13, 1982

[54] SELF-ALIGNING VALVE ASSEMBLY

[75] Inventor: Clifford V. Zieg, Costa Mesa, Calif.

[73] Assignee: Kaiser Aerospace & Electronics Corporation, Oakland, Calif.

[21] Appl. No.: 213,478

[22] Filed: Dec. 5, 1980

[51] Int. Cl.³ .............................................. E03D 1/34
[52] U.S. Cl. ........................................ 4/378; 4/397;
4/399; 4/400; 251/144; 251/294; 251/335 R; 251/335 B
[58] Field of Search .................. 4/378, 404, 410, 391, 4/399, 400, 397; 251/144, 294, 335, 188, 335 B

[56] References Cited

U.S. PATENT DOCUMENTS

| | | | |
|---|---|---|---|
| 737,941 | 9/1909 | Leithauser | 251/144 X |
| 1,458,816 | 6/1923 | Fyke et al. | 251/144 |
| 2,436,035 | 2/1948 | Cheiten | 251/366 |
| 2,788,525 | 4/1957 | Reichert | 4/404 X |
| 2,849,725 | 9/1958 | Armstrong et al. | 4/410 |
| 3,383,711 | 5/1968 | Swanson | 4/400 |
| 3,447,777 | 6/1969 | Carlson | 251/144 |
| 3,448,771 | 6/1969 | Bales, Jr. et al. | 251/294 X |
| 3,890,652 | 6/1975 | Fulton | 4/391 |
| 4,017,913 | 4/1977 | Judd | 4/378 |

Primary Examiner—Henry K. Artis
Attorney, Agent, or Firm—Marvin H. Kleinberg

[57] ABSTRACT

A self-aligning valve assembly and a valve plug therefor includes an elastomeric valve plug having an annular outer sealing portion with an annular sealing surface for sealing a drain hole valve seating of a receptacle. A central mounting portion is secured to a pair of telescoped tubes. A flexible diaphragm with a circular convoluted fold integrally connects the mounting portion and the outer sealing portion, and is capable of yielding to permit radial and/or tilting displacement of the outer sealing portion relative to the central mounting portion of the plug to accommodate limited misalignment between the valve tubes and the drain hole.

10 Claims, 10 Drawing Figures

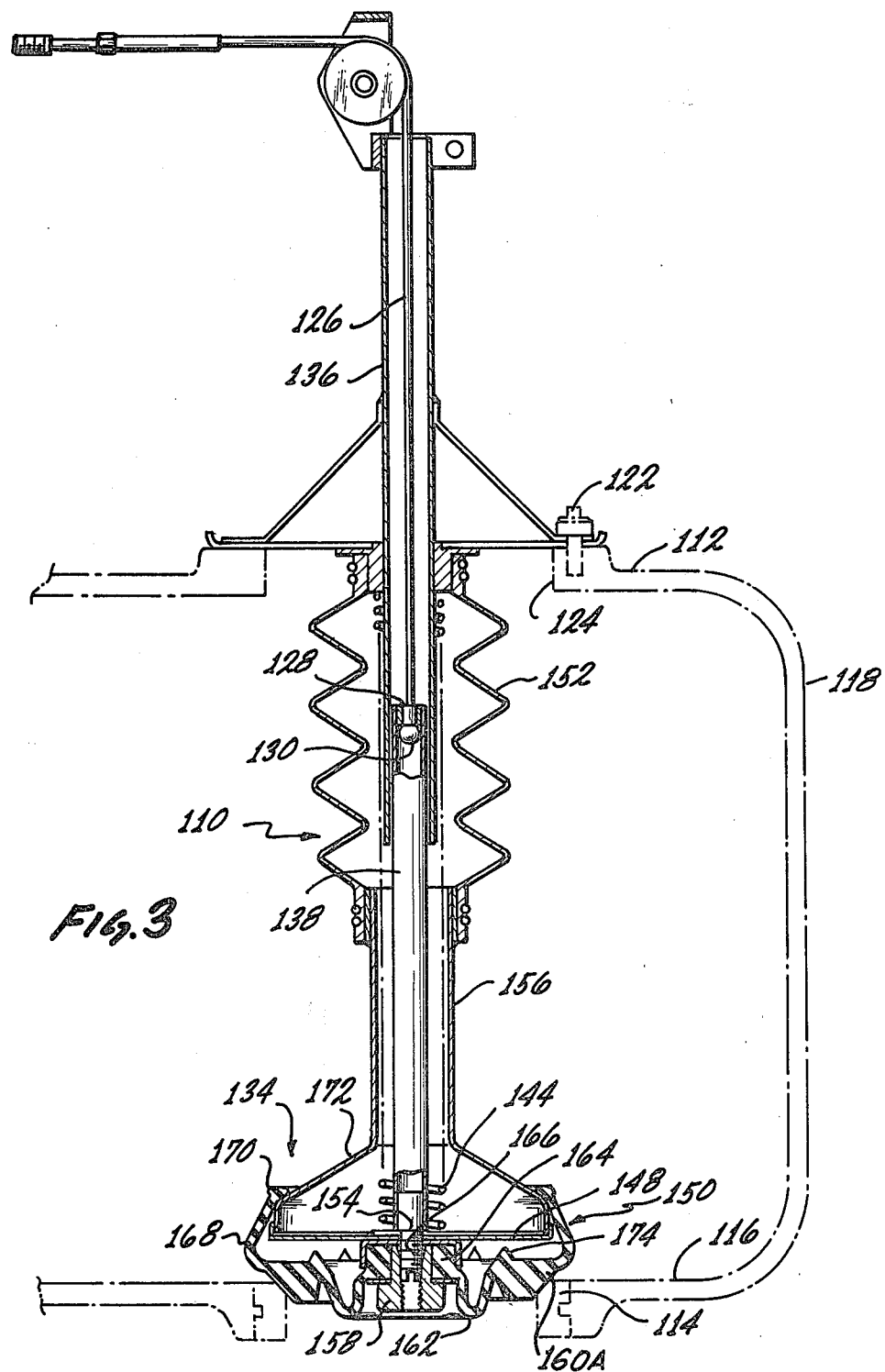

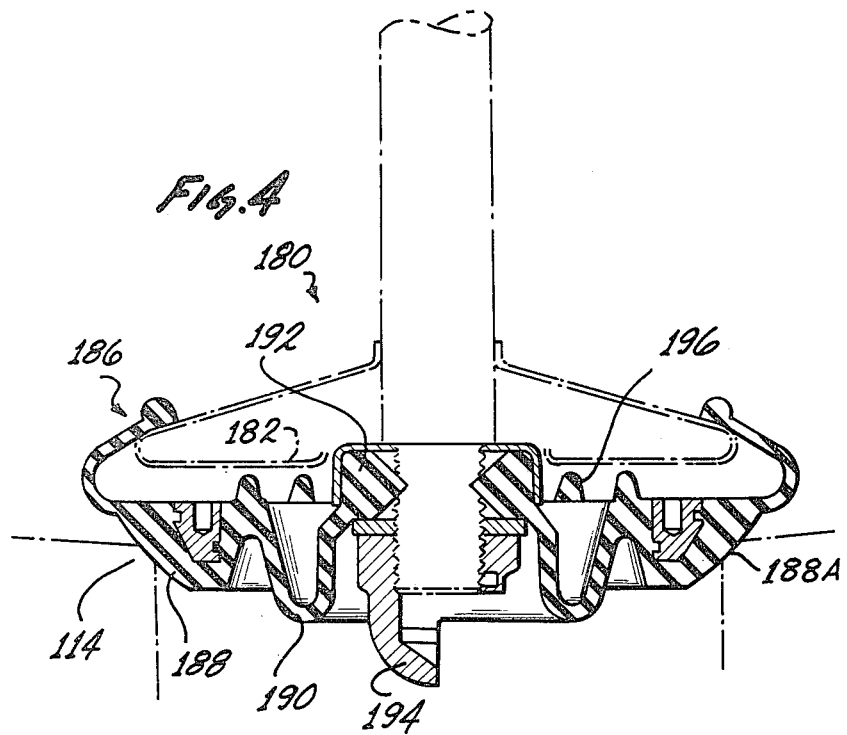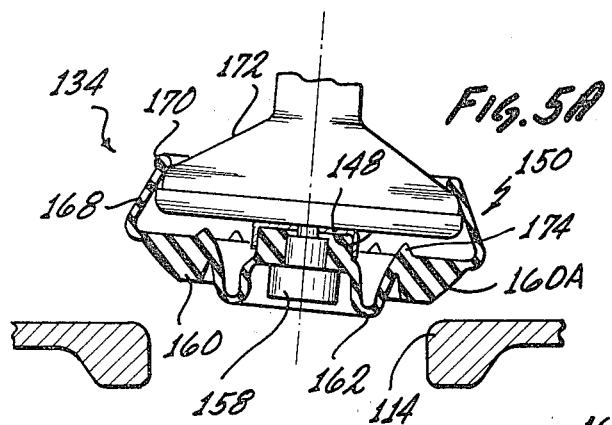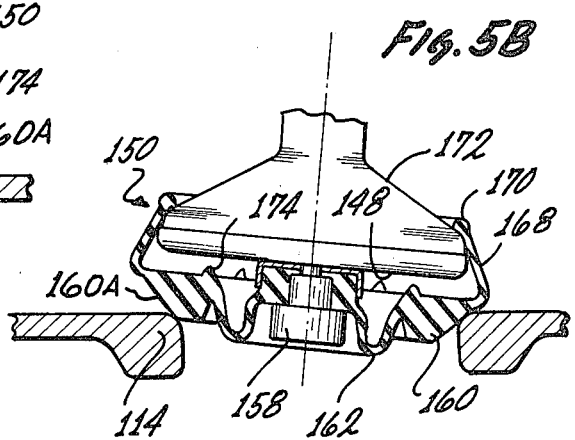

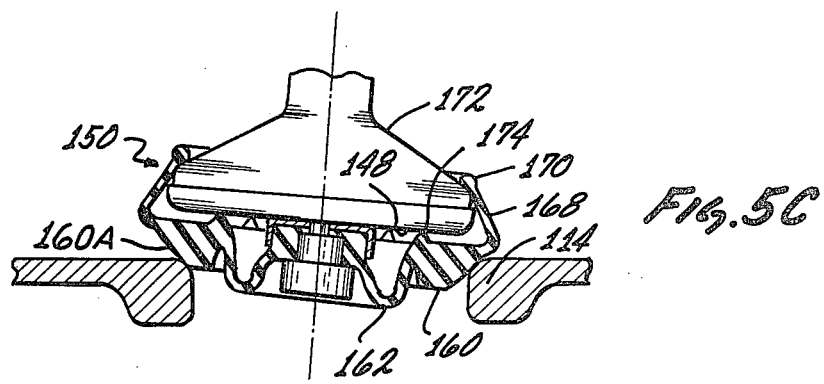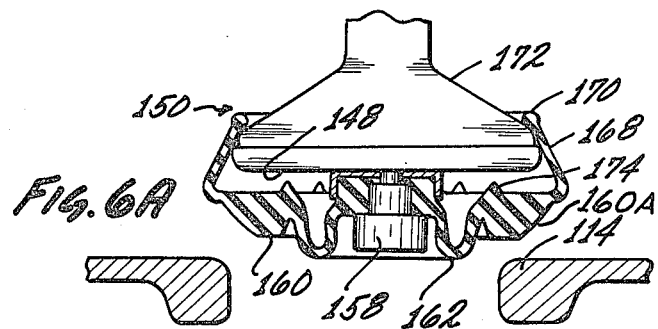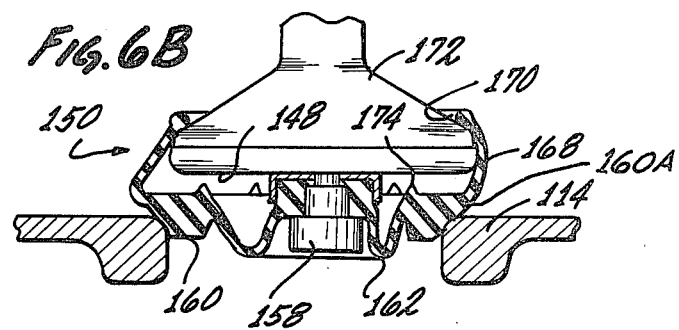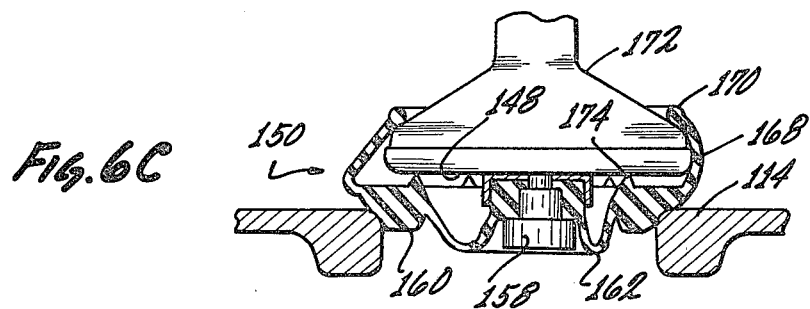

SELF-ALIGNING VALVE ASSEMBLY

BACKGROUND OF THE INVENTION

1. Field of the Invention

The valve assembly of the present invention has particular application as a closure device for use inside of an enclosed container as, for example, a waste receptacle in aircraft.

2. Description of the Prior Art

The prior art valve assemblies used in waste receptacles have been supported from the top of the receptacle and extend axially for some distance to engage a valve seat in the bottom of the receptacle. One prior art approach controlled the axial alignment of the valve plug with the valve seat by telescoping tubes. The valve plug was inserted into and held in the valve seat by a helically coiled spring which was enclosed by the telescoping tubes and was compressed between the valve plug and the support structure.

In the construction of the waste receptacle, in the installation of the valve assembly, and in the operation of the valve assembly, errors in axial alignment of the valve plug and valve seat have been encountered. In such prior art valve assemblies, when an error in axial alignment was introduced into the system, the valve plug would hang up on the valve seat and leave an opening through which the contents of the receptacle could pass.

When the prior art valves in the aircraft waste receptacle leaked, the contents of the receptacle escaped, creating a difficult and distasteful clean-up job for the aircraft maintenance personnel. In some instances, the leakage has presented a danger to the operation of the aircraft due to the formation of ice.

An alternative, prior art approach has been proposed in U.S. Pat. No. 4,017,913, to Judd. A spherical joint was included between the tapered valve plug and the telescoping alignment tubes, positioning the center of rotation of such joint on the outlet side of the tapered valve seat. This arrangement also positioned the spherical contact surface of such point (e.g., the locus of application of the compressive spring force on the valve plug) on the outlet side of the valve seat when the valve plug has engaged the valve seat.

When the valve plug was misaligned axially with the valve seat and encountered the lip of the valve seat, the spherical joint permitted the valve plug to rotate into the seat and slide into engagement with the valve seat. However, this approach required a complex mechanical assembly and was of limited utility when the drain was eccentric relative to the axis between the drain opening and the acuating mechanisms.

SUMMARY OF THE INVENTION

In recent years, the major manufacturers of such aircraft waste systems have provided a valve actuating rod which, at its remote end adjacent the drain opening, includes a substantially circular flange with a flat bottom surface that acts as a pressure plate upon an elastomeric plug member such as is disclosed in the prior art. The rod extends through the flanged pressure plate and terminates in a threaded portion which serves as a mounting point for the prior art plug.

According to the present invention, the pressure plate is utilized as in the prior art but the elastomeric plug is modified in construction to include intermediate a spherical seating surface which is adapted to engage the annular drain, a convoluted annular portion which permits some lateral motion of the annular spherical seating surface. The periphery of the plug is curved inwardly and extends far enough to enclose a portion of the upper surface of the flange. The circumferential rim extends inwardly sufficiently so that in extreme lateral displacement of the spherical seating surface against the convoluted annular portion, relative to the actuating rod would still leave the flange enclosed by the reverse curve of the plug.

In alternative embodiments, a reinforcing ring can be molded into the spherical seating element and, in yet other embodiments, a plurality of interior protuberances are provided to cooperate with the pressure plate to force the plug into tighter engagement with the drain opening.

Other variations are available in which the seating element has conical or other curvatures which can adapt to the drain opening. Yet other surface shapes to optimize the ceiling relationship between the seating surface and the drain opening can be developed within the scope of the present invention.

DESCRIPTION OF THE DRAWINGS

FIG. 3 is a side section view of an improved drain plug mounted on one commercially available rod assembly;

FIG. 4 is a side sectional view of an alternative embodiment of the drain plug shown on an alternative commercially available valve and rod assembly;

FIG. 5, including FIGS. 5a, 5b, are successive cross-sectional views of an angularly misaligned rod and drain being accommodated by the plug of the present invention; and FIG. 6, including FIGS. 6a and 6b, are successive cross-sectional views of an eccentrically misaligned rod and drain being accommodated by the plug of the present invention.

Referring to FIG. 1, a prior art drain valve assembly 10 is shown suspended between the top of the enclosed container (or receptacle) 12 and the annular valve seat 14 located in the bottom of the container 16. The valve assembly 10 as shown in FIG. 1 is in the compressed position for installation in a waste receptacle 18. FIG. 1 shows only a portion of one wall 20 of the waste receptacle 18 together with portions of the top 12 and bottom 16 of the receptacle.

Figure 1:
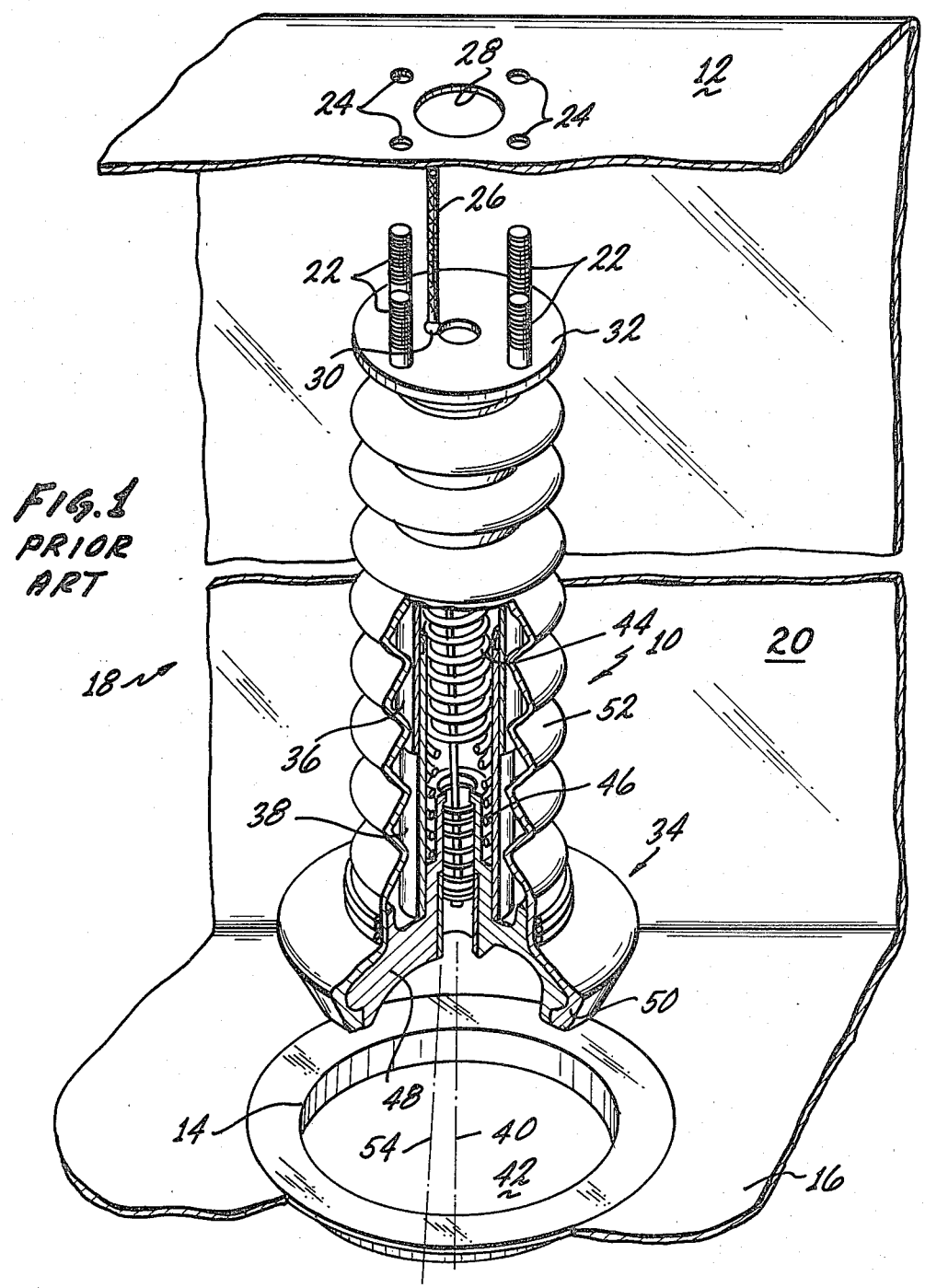
FIG. 1 is a partly broken away perspective view of a container with a prior art valve assembly.

To mount the valve assembly 10 within the receptacle 18, bolts 22 are passed through holes 24 in top 12 and affixed in position by conventional nuts (not shown).

When the valve assembly 10 is affixed in position, the actuator cable 26 passes through hole 28 in top of the container 12. In order to release the valve assembly 10 from the compressed position, cable 26 is moved into the center of hole 28 and restraining bead 30 is moved out of its detent in support flange 32. When cable 26 is released, circular valve plug 34 is guided toward valve seat 14 by telescoping tubes (36 and 38). If valve plug 34 is axially aligned with the centerline 40 of valve seat 14, the plug 34 will enter the valve seat 14 and close drain hole 42 of the waste receptacle 18.

The valve assembly 10 contains two springs, a heavy actuator spring 44 and a light cable tensioning spring 46.

The actuator spring 44 requires approximately 40 pounds of force to be fully compressed. The cable tensioning spring 46 requires approximately .5 pounds of force to be fully compressed.

When the valve assembly 10 is in the closed position (not shown) actuator spring 44 is compressed between valve plug 34 and support flange 32. In the closed position the compressive force of helical coiled spring 44 on valve plug 34 holds the plug in the valve seat and prevents fluids from waste receptacle 18 from passing through drain hole 42.

The purpose of cable tensioning spring 46 is to remove the slack from cable 26 when the valve assembly is installed and the valve plug is in the closed position. Cable 26 connects the maintenance dump handle (not shown) with the valve assembly.

In the normal operation of the valve assembly, aircraft maintenance personnel pull the dump handle (not shown) which moves cable 26 to compress the cable tensioning spring 46. When the cable tensioning spring 46 is completely compressed in core 48 the cable 26 pulls against the compressive force of the actuator spring 44 and telescoping tubes 36 and 38 contract and valve plug 34 unseats and moves vertically to open drain hole 42.

When receptacle 18 is emptied, the dump handle (not shown) is released which in turn permits cable 26 to move and actuator spring to urge valve plug toward drain hole 42. Telescoping guide tubes 36 and 38 are designed to direct plug 34 into the proper position in valve seat 14.

Valve plug 34 is composed of two pieces, an inner core 48 made of aluminum or plastic to give shape and strength to the valve plug and an outer cover 50 made of rubber or other resilient material for sealing purposes.

Surrounding the telescoping tubes 36 and 38 is an expandable rubber ribbed boot 52 which protects the tubes 36 and 38 and actuator spring 44 from the contents of the waste receptacle.

In the past, errors in axial alignment of the valve assembly 10 and the valve seat 14 have been introduced into the system as a result of defects in the manufacturing of the waste receptacle, errors in installation of the valve assembly, and by deflection or distortion of the receptacle top in the operation of the valve assembly itself. When the valve plug was out of axial alignment as shown by line 54, the valve plug engaged the side of valve seat 14 and would hang up on the valve seat 14 and leave a crescent-shaped opening through drain hole 42.

Figure 2:
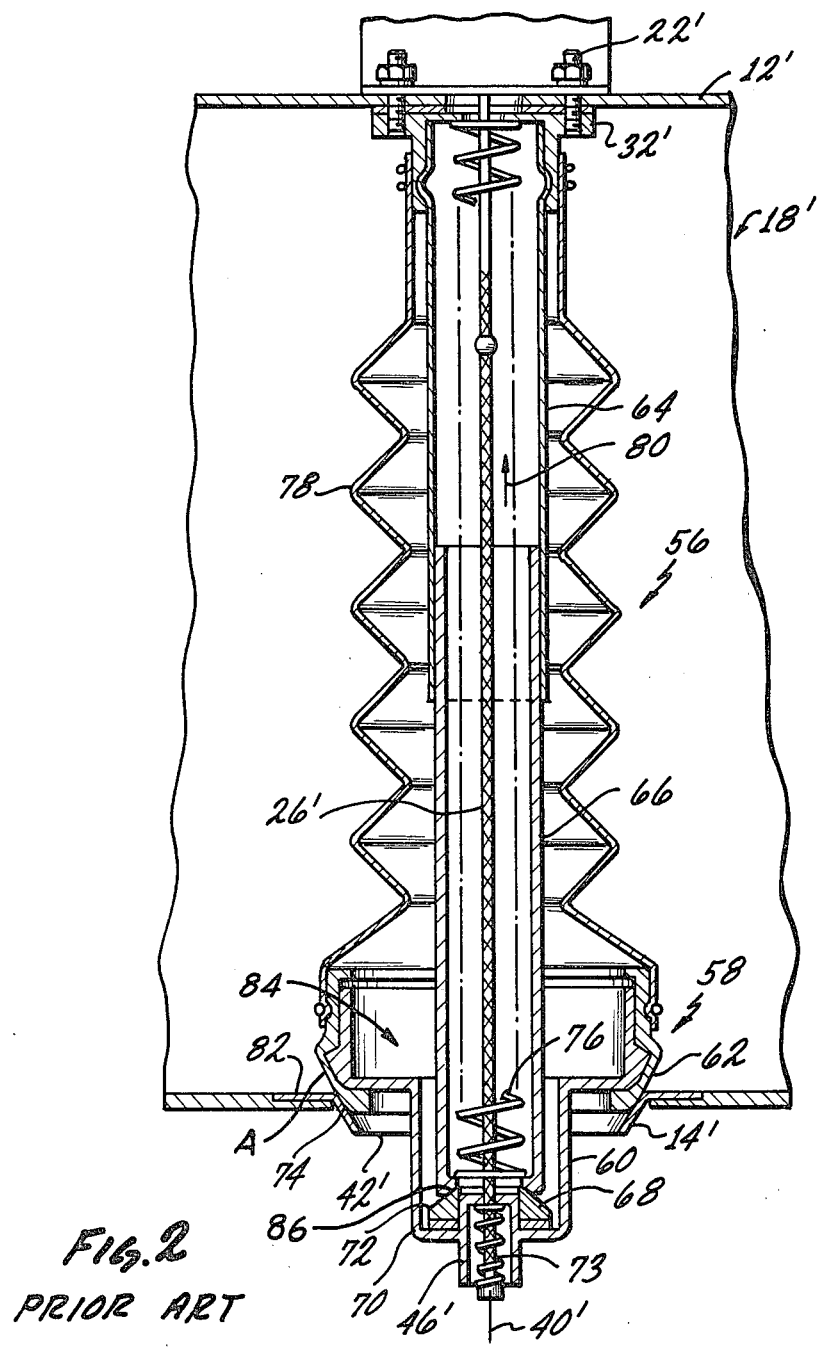
FIG. 2 is a side section view of an alternative self-aligning prior art valve assembly.

The purpose of the inventive drain valve assembly as shown in FIG. 2 is to overcome the misalignment errors introduced into the system as previously described and assist the valve plug in properly seating in valve seat.

FIG. 2 depicts an alternative prior art drain valve assembly. The valve assembly is mounted in an enclosed waste receptacle which hold support structure (flange) to the top of the receptacle. Telescoping guide tubes 64 and 66 hold improved plug 58 in approximate alignment with centerline 40' of valve seat 14'. The improved plug 58 is shown engaging the valve seat 14' to close drain hole or annulus 42'.

In FIG. 2 valve plug 58 is misaligned with valve seat 14' and has engaged the lip 82 of valve seat 14'. The misalignment 81 is represented by the distance between centerline 40' of valve seat 14' and centerline 83 of tube 66. When the plug 58 engages the lip 82 of valve seat 14', it rotates in an arc as shown by arrow 84.

The improved valve plug can rotate in the direction of arc 84 because of spherical joint 86 between tube 66 and spherical ring member 68.

When the valve plug 58 is in the position as shown in FIG. 2, the compressive force of helical actuator spring 76 on the base of lower tube 66, through spherical joint 86, and upon plug 58 assists plug 58 to slide on the valve seat 14' into the full seating contact position shown.

Turning next to FIG. 3, there is shown an improved self-aligning valve assembly according to the present invention. In FIG. 3, there is shown some of the same elements as in FIGS. 1 and 2 which may be illustrated as slightly different as a result of immaterial design modifications by the manufacturers of the aircraft waste tanks.

In FIG. 3, there is shown an improved drain valve assembly 110 which is mounted in the top 112 of the waste tank. A drain valve seat 114 is located in the bottom 116 of the tank 118. The assembly 110 is held in place by fasteners such as bolts 122.

The valve assembly 110 extends through a fairly large opening 124 in top 112. As in the prior art, a cable 126 which is threaded through a hole 128 and terminates in a restraining bead 130.

The improved valve plug assembly 134 is fastened to a telescoping tube combination including an upper tube 136 and a lower tube 138. The hole 128 through which the cable 126 extends if the termination of the lower tube 138 and enables the cable to telescope the lower tube 138 into the upper tube 136. A heavy actuator spring 144 bears against a pressure plate 148 upon which is mounted the improved self-aligning valve plug 150 of the present invention.

A ribbed boot or bellows 152 encloses the area where the telescoping tubes 136 and 138 are joined to keep waste materials out of the operating mechanism. The lower end of the lower telescoping tube 138 includes a threaded bolt element 154 by means of which the pressure plate and valve plug are fastened to the lower telescoping tube 138.

In this embodiment, the pressure plate 148 includes an upper cylindrical portion 156 to which is fastened the lower end of the boot member 152 in a substantially fluid tight seal. A special nut 158 fasten both the plug 150 and the pressure plate 148 to the lower telescoping tube 138.

The improved valve plug 150 is, as in the prior art devices, preferably of an elastomeric compound to facilitate a fluid tight seal against the valve seat 114. The valve plug 150 includes an annular substantially conical seating surface 160 which, in the preferred embodiment, has a peripheral surface that is a section of a sphere. Adjacent the annular seating surface 160 is a annular convoluted fold which is adjacent a thickened central portion 164 having a central opening 166 through which the bolt 154 projects.

Adjacent the annular seating surface 160 is a continuation of the plug wall which extends as a side wall portion 168 which ends in a thicker circumferential edge portion 170 which rests against an upper surface 172 of the seating member 148. On the interior of the valve plug 150 positioned around the interior surface of the annular seating surface 160 is a plurality of integral stand off elements or posts 174 against which the pressure plate 148 bears to seat the annular seating surface 160 in the valve seat 114. Because the maximum diameter of the plug 150 and the side wall 168 is somewhat greater than the diameter of the pressure plate 148, even though the center of the valve plug 150 is fastened to the central bolt 154, some lateral or radial movement of the annular seating surface 160 is possible relative to the drain valve assembly which would otherwise be substantially rigid in the lateral direction, comprised as it is of closely fitting telescoping cylinders which are firmly mounted at one end to the tank 118.

As one can see, the entire valve assembly is constrained to move only vertically upon actuation of a drain lever which causes the cable 126 to rise, telescoping the tubes and pulling the valve plug 150 out of the valve seat 114.

The spherical curvature to the annular seating surface 160 permits the valve plug 150 to seal the valve seat even if the plug 150 is tilted by a limited amount out of the horizontal plane. Further, if the telescoping rods are not concentric with the valve seat, the convoluted fold 162 together with the difference in diameter between the pressure plate 148 and the side wall 168 permits some lateral movement of the annular seating surface even though the plug is held at its center.

Turning next to FIG. 4, there is shown a portion of an alternative drain valve assembly 180. In FIG. 4, only the pressure plate 182 and lower telescoping tube 184 are shown in combination with a modified valve plug 186 according to the present invention.

Since the pressure plate 182 differs in design from the pressure plate 148, the valve plug 186 is modified to accommodate these differences. The basic features, however, are unchanged in that the valve plug 186 includes an annular seating surface 188 which, in the preferred embodiment although of generally conical shape presents a curved surface corresponding to the section of a sphere which engages the valve seat 114. A convoluted fold 190 occupies the space between the annular seating surface and a central mounting portion 192 which include an aperture through which appropriate mounting hardware is. In this apparatus, a conventional nut 194 is used to capture the valve plug 186.

As with the valve plug 150 of FIG. 3, this valve plug 186 includes a plurality of inner posts 196 which are acted upon by the pressure plate 148. The use of the inner posts 196 on the valve plug 186 or the posts 174 on the plug 150 tends to equalize the application of force against the valve seat as well as minimizing the resistance to lateral movement of the plug and the annular seating ring. To minimize the friction and resistance to lateral motion, in the preferred embodiment, the inner posts 174, 196 are conical so that a limited surface area is presented to the pressure plates with which they cooperate.

Turning next to FIG. 5, there is shown in FIGS. 5A through C, the valve plug of the present invention accommodating for an angular misalignment of the valve plug 134. As seen in FIG. 5A, the descending valve plug 134 is axially misaligned with the opening 114 and is approaching at a slight angle.

As can be seen in FIG. 5B, the seating surface, which is a section of a sphere, can, through limited angles, accommodate limited angular misalignment. Within those limits, the plug 150 will seat in the opening 114 as shown in FIG. 5B, and as the valve continues to descend as shown in FIG. 5C, the pressure plate 148 contacts the inner posts 174 and through there exerts a ceiling pressure against the valve plug 150 as a whole and the annular seating surface 160 in particular.

The convoluted annular fold 162 can also accommodate some lateral misalignment resulting from the axial misalignment. Within the limits of accommodation, the annular seating surface 160 will form a fluid tight seal against the annular valve seat 114.

Similarly, FIG. 6, including FIGS. 6A through C, illustrate how the improved plug of the present invention can accommodate an axial misalignment of the valve assembly 134. In this type of misalignment, the role of the convoluted fold 162 assumes greater importance.

As shown in FIG. 6B, the initial engagement of the valve seat 114 with the seating surface 160 causes the plug 150 to be laterally displaced by the camming action of the seat 114 against the annular seating surface 160. The convoluted annular fold 162 is therefore compressed on one side while expanded slightly on the other. Further, the sidewall 168 also accommodates some lateral motion of the annular seating surface 160.

As the valve plug assembly 134 reaches the end of its travel, the pressure plate 148 has engaged the inner posts 174 and through there exerts a downward force on the annular seating member 160. The spherical annular seating surface 160 tends to center itself within the drain opening 114 and the limited surface area of the post 174 provides a minimum of frictional resistance to the translational motion of the plug 150 relative to the pressure plate 148.

In the final configuration, the pressure plate 148 is bearing on the seating surface 160 through the inner posts 174 and the sidewall member 168 remains in substantially sealing contact with the conical wall of the valve plug assembly 134. With the application of pressure to the inner post 174, the annular seating member 160 engages the valve seat 114 in a fluidtight seal. The annular convolution 162 permits the center of the valve assembly 134 to be laterally displaced from the center of the valve seat 114 while the annular seating member 160 is centered.

Thus, there has been disclosed and shown in alternative embodiments, an improved self-aligning plug element for a valve assembly useful in waste tanks. The plug includes an annular seating surface which is integrally connected to the valve assembly by means of an intermediate annular convoluted fold that permits some lateral movement between the center of the plug and the annular seating surface. Further, in the preferred embodiment, the seating surface is a section of a sphere, thereby permitting some axial misalignment of the plug assembly which can be accommodated by the spherical surface and the annular convolution.

The plug itself includes an upper wall which is retroverted to adapt to the commercially available valve plug assemblies and includes sufficient space in the radial direction to retain a substantially fluidtight contact with the valve element while the seating element is annularly displaced. The provision of inner posts between the pressure plate portion of the available valve to transmit the ceiling force through an even and uniform application of pressure with a minimum of resistance to lateral motion relative to the plate.

Other embodiments will appear to those skilled in the art without departing from the inventive concepts disclosed herein. Therefore, the scope of the invention should be limited only by the claims appended hereto.

What is claimed as new is:

1. A valve assembly for use inside of an enclosed container comprising:

a support structure capable of being mounted on the outside of the container, opposite an annulus defining a drain hole, said drain hole having an inlet side and an outlet side;

coupling means including a pressure plate joining said support structure to sealing means;

sealing means including a circular valve plug centrally attached to said coupling means;

said plug being of elastomeric material and having an integral spherical seating surface and an annular lip member enclosing said pressure plate;

said plug including an annular fold intermediate said seating surface and the plug center, for permitting movement of said seating surface relative to said coupling means;

whereby said seating surface can effect a fluid tight seal of the drain hole when said coupling means is not fully aligned with the drain hole.

2. The valve assembly of claim 1 wherein said sealing means plug further includes:

an inner surface adapted to be adjacent said pressure plate;

at least two integral stand off elements on said inner surface for contacting said pressure plate and for transmitting sealing force to said seating surface;

whereby lateral movement of said plug relative to said pressure plate is facilitated during application of sealing pressures by said pressure plate.

3. For use with a valve assembly intended for the inside of container, container having an annulus defining a drain hole, the valve assembly to be controlled from the exterior of the container, the valve assembly including valve control means mounted on the exterior of the container on a surface opposite the annulus, a valve rod coupled to said valve control means and extending through the interior of the container, and a valve plate connected to said valve rod, adjacent the annulus, an elastomeric plug member adapted to be fitted to the rod and having a seating annulus adapted to fit into the drain opening defining annulus;

said plug member having an integral, annular convoluted fold on the seating surface thereof, thereby permitting lateral movement of said seating annulus with respect to the valve assembly when the valve rod is not coaxial or concentric with respect to the drain hole.

4. The plug of claim 3 further including an inner surface adapted to be adjacent the valve plate and at least two integral stand off elements on said inner surface for contacting the valve plate and for transmitting sealing forces therefrom whereby lateral movement of said plug relative to the valve plate is not impeded during application of sealing pressures by friction between the pressure plate and said inner surface.

5. The plug of claim 3 further including:

a reinforced, thickened lower central ring portion adapted to fit on the valve rod and be captured thereon; and a retroflex wall portion extending outwardly from said seating portion toward the rod resulting in a substantially toroidal body, said wall portion terminating in a reinforced, thickened, upper rim, adapted to fit closely on the rod over said valve plate member.

6. For use in a tank system having an annular drain opening in one wall and a drain valve including an actuating rod mounted in the opposite wall substantially in alignment with the drain opening, the actuating rod including at its free end a pressure plate element, a plug member comprising:

(1) a drain engaging lower surface having an annular substantially spherical seating surface adapted to fit into the drain opening;

(2) central fastening means including means adapted to cooperate with the pressure plate element;

(3) an annular convoluted fold intermediate said seating surface and said central fastening means to permit limited movement of said seating surface relative to the actuating rod and pressure plate; and (4) a retroflex circumferential edge folding back toward the rod to partially enclose the pressure plate element between said circumferential edge and said drain engaging surface;

whereby limited misalignments of the rod and drain opening can be accommodated by translational and rotational motion of said seating surface, permitted by said annular convoluted fold.

7. Circular drain plug adapted to be mounted on a plate that is adapted to be deployed to seal an aperture:

said plug including an interior portion and a retroflex portion partially enclosing the plate;

said plug having an annular seating surface adapted to fit into the aperture and, when urged by the plate, forming a fluid tight seal with the aperture;

said plug having an annular bellows intermediate the seating surface and the center, permitting radial translation of said annular seating surface; whereby misalignments of the plate and the aperture are accommodated and corrected by translation of said seating surface.

8. The plug of claim 7 wherein said annular seating surface is a zone of a sphere.

9. The plug of claim 7 wherein said annular seating surface is a conic section.

10. The plug of claim 7, further including on the interior surface thereof adjacent said seating surface, at least two integral stand off elements adapted to contact the plate and transmit forces therefrom to said seating surface without creating substantial resistance to seating surface motion in a direction substantially parallel to the plate.

* * * * *